April 3, 1928. 1,665,076
K. TESSKY
FRICTION DISK CLUTCH
Filed Nov. 30, 1926
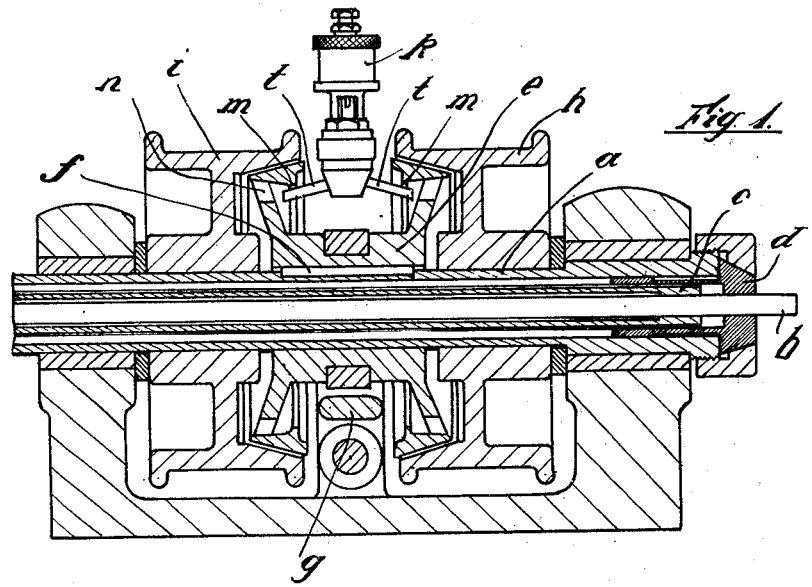
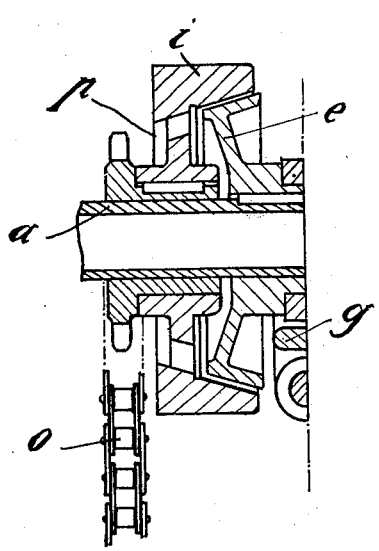
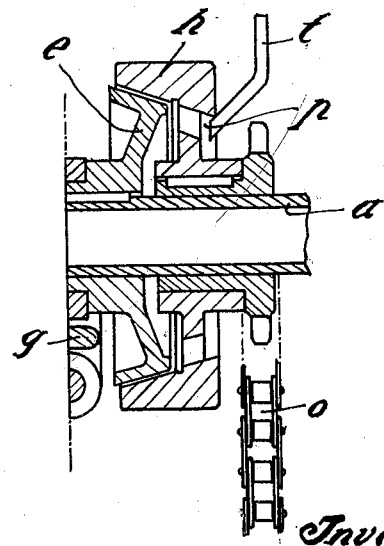
Inventor:
Karl Tessky Patented Apr. 3, 1928.

1,665,076

UNITED STATES PATENT OFFICE.

KARL TESSKY, OF ESSLINGEN-ON-THE-NECKAR, GERMANY.

FRICTION DISK CLUTCH.

Application filed November 30, 1926, Serial No. 151,718, and in Germany December 17, 1925.

My invention refers to friction disk clutches and more especially to means for lubricating such clutches. In order to prevent the conical friction disks from sticking, means must be provided for applying a lubricant to the engaging surfaces of the disks. As a rule lubrication of these surfaces is effected by the oil escaping from the bearings of the rotary hollow friction cones which is driven by centrifugal action towards the hollow engaging conical surfaces of the clutch. This mode of lubrication has, however, proved to be insufficient in the case of friction cones rotating with a particularly high number of revolutions. For in such case the oil is thrown outside from the disk bearings with an extraordinary velocity, thereby causing the conical surfaces to get dry after a short time. Apart therefrom, owing to the far greater circumferential velocity the conical frictional surfaces are also subjected to higher heating. All these circumstances favor a sticking and deterioration of the clutches connected with high speed shafts, such as form, for instance, part of automatic or semiautomatic machines when cutting thread or the like, ordinary lubricating means not being applicable in such cases. As a type of such a clutch may be cited the frictional clutches, one part of which cooperates with a pulley rotating in one, the other part with a pulley rotating in the other direction, both pulleys being mounted on a hollow shaft enclosing the material to be acted upon as well as the means for gripping and feeding same, so that axial lubrication is impossible.

According to the present invention clutches such as are used in the case described and in other cases can be lubricated easily and reliably by applying the lubricant to a point of one of the parts of the clutch intermediate its centre and its conical circumferential surface, and preferably to an opening provided at such point, and allowing the lubrication applied to it to be driven across the part of the clutch and towards the contacting frictional surfaces by centrifugal action.

In the drawings accompanying this specification and forming part of this application three modifications of a clutch embodying my invention are illustrated diagrammatically by way of example.

In the drawings

Fig. 1 is an axial section of a reversible clutch forming part of an automatic lathe, while Fig. 2 is a similar view of a clutch driven by means of a chain and sprocket wheel, and Fig. 3 is a like view of a further modification.

Referring first to Fig. 1, $a$ is a hollow shaft in which are housed the bar $b$ of the material to be acted upon, the feed grip $c$ and the conical grip $d$. $e$ is the double friction disk secured to shaft $a$ by means of a key $f$ and capable of being displaced axially by means of a lever $g$ in a well known manner so as to engage either with the hollow friction cone of the right hand pulley $h$ or with the hollow friction cone of the left hand pulley $i$. Into the gap between the two pulleys $h$ and $i$ extends a drop lubricator $k$ of some well known construction having two lubricating tubes $t$ extending in the direction towards the inner faces of the double cone $e$. The rims of the double cone are formed with conical surfaces both outside and inside, and the tubes $t$ are arranged in such manner that the oil will be deposited on a point of the inner surface of the double cone, which is adjacent to the hub of the double cone, so as to be subjected to a vigorous centrifugal action, which causes the oil deposited at this point to be forced to the outside and, in flowing round the edge of the rim will cover the outer conical surface thereof. Preferably an inwardly projecting flange $m$ is provided on the inner portion of the rims of the conical disk, this flange serving for preventing the oil driven to the other side of the disk from returning to its point of issue. $n$ is one of a plurality of openings provided in the disk wall and serving for allowing the oil to pass through to the other side.

In the modification shown in Fig. 1 a separate lubricating device $k$ is provided. However, if the shaft is, for instance, driven by means of a chain such as $o$ in Figs. 2 and 3, the lower part of which passes through an oil well (not shown) the oil which is raised by the chain $o$ can be utilized for the lubrication of the clutch, for the oil will be forced away from the chain by the pressure of the tooth gripping the chain and, in an arrangement as shown in Fig. 2, will be thrown directly onto a part $p$ of the hollow friction cone $i$, which is provided with openings such as described with reference to Fig. 1, which allow the oil to pass through to the other side of the cone and to enter the gap between the two frictional surfaces. In this case no conical surfaces tapering in opposite directions are provided, but the surface $p$ which receives the lubricant acts like a rear extension of the conical surface of the hollow cone $i$.

As shown in Fig. 3, a separate lubricator $t$ can be provided also in the case where the shaft $a$ is driven by means of a chain $o$.

I wish it to be understood that I do not desire to be limited to the exact details of construction shown and described for obvious modifications will occur to a person skilled in the art.

I claim:—

1. A friction disk clutch comprising a conical friction disk having an opening intermediate its centre and its conical circumferential surface and stationary means near said opening for supplying lubricant into said opening.

2. A friction disk clutch comprising a pair of hollow cones, a pair of conical friction disks mounted between said cones for axial displacement, each disk being arranged for cooperation with the cone nearest to it and having an opening intermediate its centre and its conical circumferential surface, a drop lubricator mounted between said disks and oil pipes leading from said lubricator to a point near the opening in each disk.

In testimony whereof I affix my signature.

KARL TESSKY.